US011334360B2

(12) United States Patent
Hu et al.

(10) Patent No.: US 11,334,360 B2
(45) Date of Patent: May 17, 2022

(54) HIGH THROUGHPUT DISASSEMBLY SYSTEM FOR EXECUTABLE CODE AND APPLICATIONS

(71) Applicants: DEEPBITS TECHNOLOGY INC., Riverside, CA (US); THE REGENTS OF THE UNIVERSITY OF CALIFORNIA, Oakland, CA (US)

(72) Inventors: Xunchao Hu, Riverside, CA (US); Sheng Yu, Riverside, CA (US); Heng Yin, Riverside, CA (US)

(73) Assignees: DEEPBITS TECHNOLOGY INC., Riverside, CA (US); THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 0 days.

(21) Appl. No.: 17/243,570

(22) Filed: Apr. 29, 2021

(65) Prior Publication Data
US 2021/0349723 A1 Nov. 11, 2021

Related U.S. Application Data

(60) Provisional application No. 63/020,660, filed on May 6, 2020.

(51) Int. Cl.
*G06F 9/38* (2018.01)
*G06F 8/53* (2018.01)
*G06N 3/08* (2006.01)
*G06N 3/04* (2006.01)

(52) U.S. Cl.
CPC .............. *G06F 9/3838* (2013.01); *G06F 8/53* (2013.01); *G06N 3/04* (2013.01); *G06N 3/08* (2013.01)

(58) Field of Classification Search
CPC ....................................................... G06F 8/53
See application file for complete search history.

(56) References Cited

U.S. PATENT DOCUMENTS

| 8,510,713 | B1 * | 8/2013 | Ormandy ............ G06F 11/3688 717/124 |
| 9,135,442 | B1 * | 9/2015 | Kennedy ................ G06F 21/563 |
| 2009/0235054 | A1 * | 9/2009 | Pan ............................ G06F 8/53 712/208 |
| 2010/0235913 | A1 * | 9/2010 | Craioveanu ........... G06F 21/563 726/23 |
| 2018/0082064 | A1 * | 3/2018 | Wang ...................... G06N 20/00 |
| 2019/0370473 | A1 * | 12/2019 | Matrosov ............. G06K 9/6256 |
| 2020/0364334 | A1 * | 11/2020 | Pevny ................... G06F 21/567 |
| 2021/0011694 | A1 * | 1/2021 | Ni ......................... G06N 3/0454 |

* cited by examiner

*Primary Examiner* — Michael J Metzger
(74) *Attorney, Agent, or Firm* — Xsensus LLP

(57) ABSTRACT

The present invention performs high-throughput disassembly for executable code comprising a plurality of instructions. An input of the executable code is received. Exhaustive disassembly is performed on the executable code to produce a set of exhaustively disassembled instructions. An instruction flow graph is constructed from the exhaustively disassembled instructions. Instruction embedding is performed on the exhaustively disassembled instructions to construct embeddings.

20 Claims, 6 Drawing Sheets

A concrete example of DeepDisasm's instruction classification process.

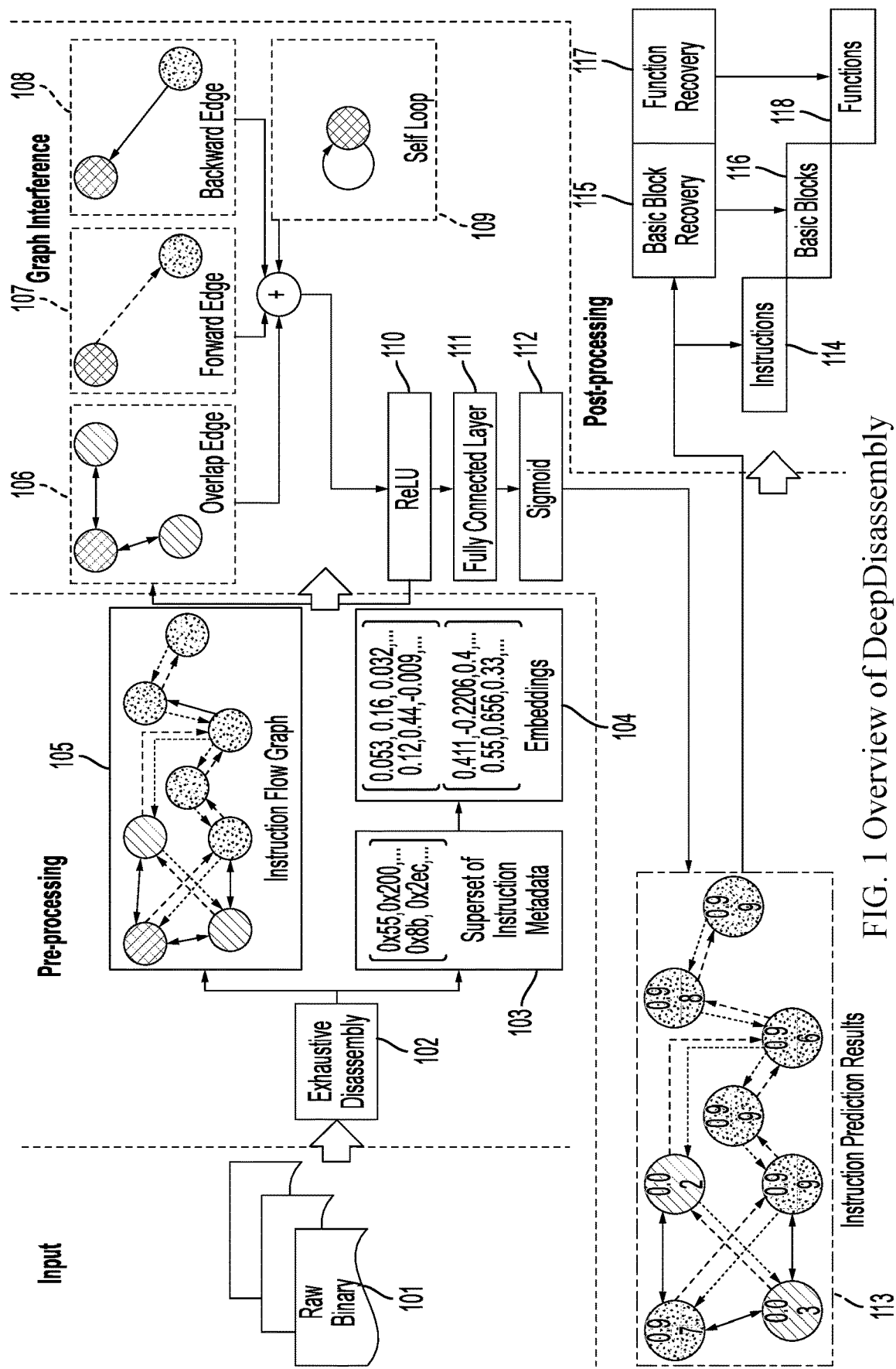
FIG. 1 Overview of DeepDisassembly

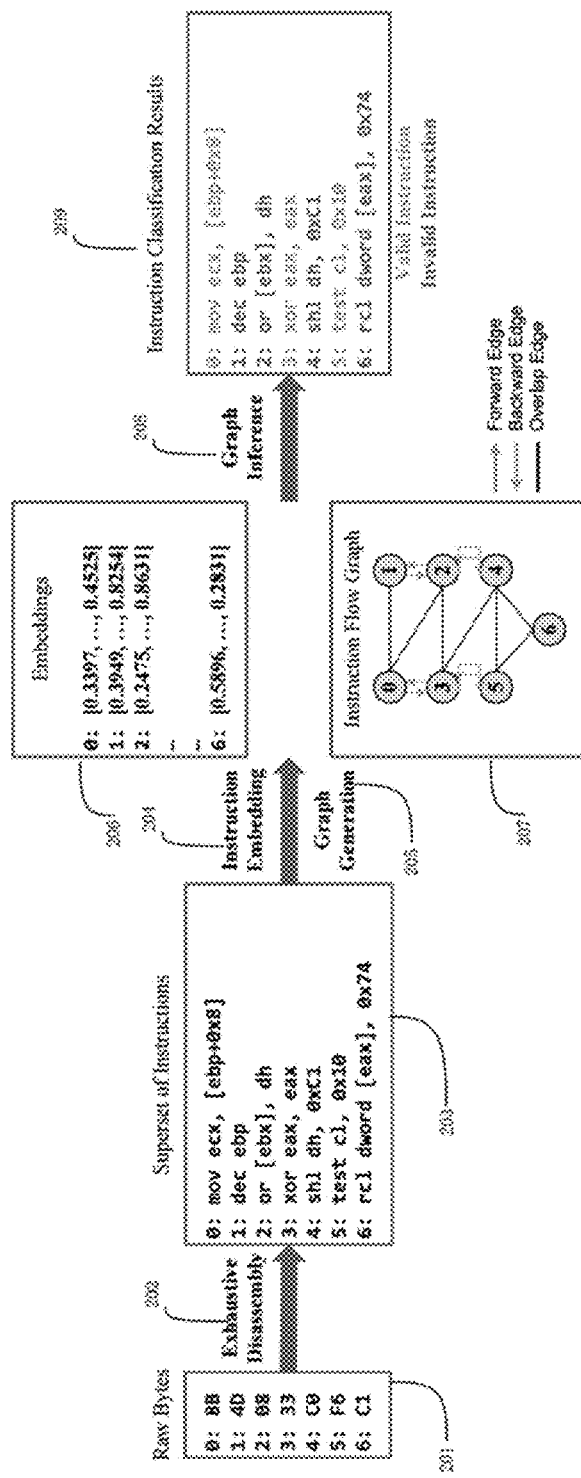
FIG. 2 A concrete example of DeepDisasm's instruction classification process.

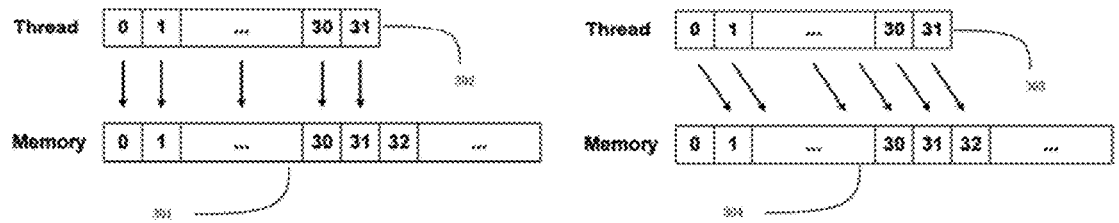
FIG. 3 GPU Disassembly State at Different Time
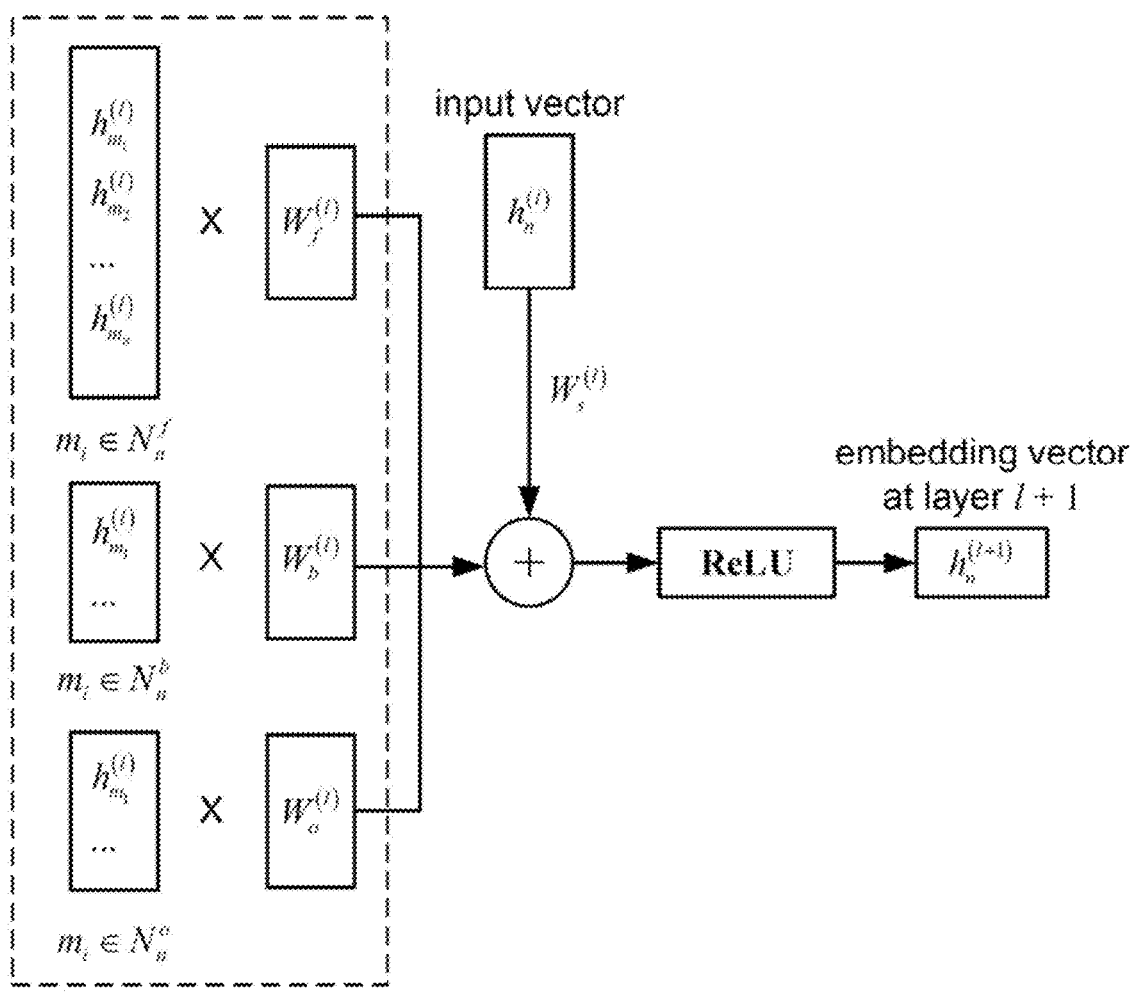
FIG. 4 Embedding propagation in each layer $l$.

```
OptOpt
00E71070    mov         edi,dword ptr [argv]
00E71073    xor         eax,eax
00E71075    cmp         dword ptr [edi+ecx*4],eax
00E71078    setne       al
00E7107B    inc         ecx
00E7107C    lea         eax,[eax*2+1]
00E71083    add         edx,eax
00E71085    cmp         ecx,esi
00E71087    jl          0E71073h
00E71089    jmp         0E75177h
00E7108E    mov edi,    edi
```

FIG. 5 Basic Block Recovery Example

```
OptOpt
40330E                  jmp         ds:off_415020[rax*8]
......
40335F  loc_40335F:
40335F                  mov         [rdi+3], sil
403363                  shr         rsi, 8
403367  loc_403367:
403367                  mov         [rdi+2], sil
40336B                  shr         rsi, 8
40336F  loc_40336F:
40336F                  mov         [rdi+1], sil
403373                  shr         rsi, 8
403377  loc_403377:
403377                  mov         [rdi], sil
40337A                  pop         rbp
40337B                  retn
```

FIG. 6 Fallthrough Example

HIGH THROUGHPUT DISASSEMBLY SYSTEM FOR EXECUTABLE CODE AND APPLICATIONS

CROSS-REFERENCE TO RELATED APPLICATION

The present application claims the benefit of U.S. Provisional Patent Application No. 63/020,660, filed May 6, 2020, whose disclosure is hereby incorporated by reference in its entirety into the present disclosure.

STATEMENT REGARDING FEDERALLY SPONSORED RESEARCH OR DEVELOPMENT

This invention was made with government support under Contract No. 1719175 awarded by the National Science Foundation and under Contract No. N00014-17-1-2893 awarded by the Office of Naval Research. The government has certain rights in the invention.

THE NAMES OF THE PARTIES TO A JOINT RESEARCH AGREEMENT

Not applicable

INCORPORATION-BY-REFERENCE OF MATERIAL SUBMITTED ON A COMPACT DISC

Not applicable

BACKGROUND OF THE INVENTION

A disassembler takes a binary program as input and produces disassembly code and some higher-level information, such as function boundaries, control flow graph, etc. Most binary analysis tasks take disassembly code as input to recover syntactic and semantic level information of a given binary program. As a result, disassembly is the most critical building blocks for binary analysis problems, such as vulnerability search, malware classification, and reverse engineering.

Disassembly is surprisingly hard, especially for x86 architecture, due to variable-length instructions and interleaved code and data. As a result, a simple linear sweep approach like objdump, in spite of high efficiency, suffers low disassembly correctness. There has been a long history of research on improving disassembly accuracy. For instance, recursive disassembly identifies true instructions by following control transfer targets. It largely eliminates false instructions but may miss many true instructions that are not reached by other code blocks, leading to low true positive rate. It also suffers low runtime efficiency because it needs to repeatedly traverse the control flow.

Sadly enough, despite the importance of disassembly, we still do not have a disassembler that is both accurate and fast, for cybersecurity industry. As a result, in cybersecurity practices, disassemblers are only used in less time-critical tasks (like postmortem analysis and incidence response). As for time-critical tasks (like malware detection), raw binary code is directly fed into machine-learning modules or Yara rules. Such approaches are extremely vulnerable to adversarial attacks, since only superficial features are picked up at raw-byte level.

BRIEF SUMMARY OF THE INVENTION

In light of the above, the present invention is directed to an improved disassembler and to a corresponding method and computer-readable medium, as disclosed herein.

BRIEF DESCRIPTION OF THE DRAWINGS

An illustrative and non-limiting embodiment will bet set forth with reference to the drawings, in which:

FIG. 1 illustrates the general flow of the whole system according to various embodiments of the present invention.

FIG. 2 illustrates an example of the general flow of the whole system.

FIG. 3 illustrates the GPU disassembly state at different time.

FIG. 4 illustrates the embedding propagation in each layer l.

FIG. 5 illustrates a basic block recovery example.

FIG. 6 illustrates a fallthrough example.

DETAILED DESCRIPTION

Figure 7:
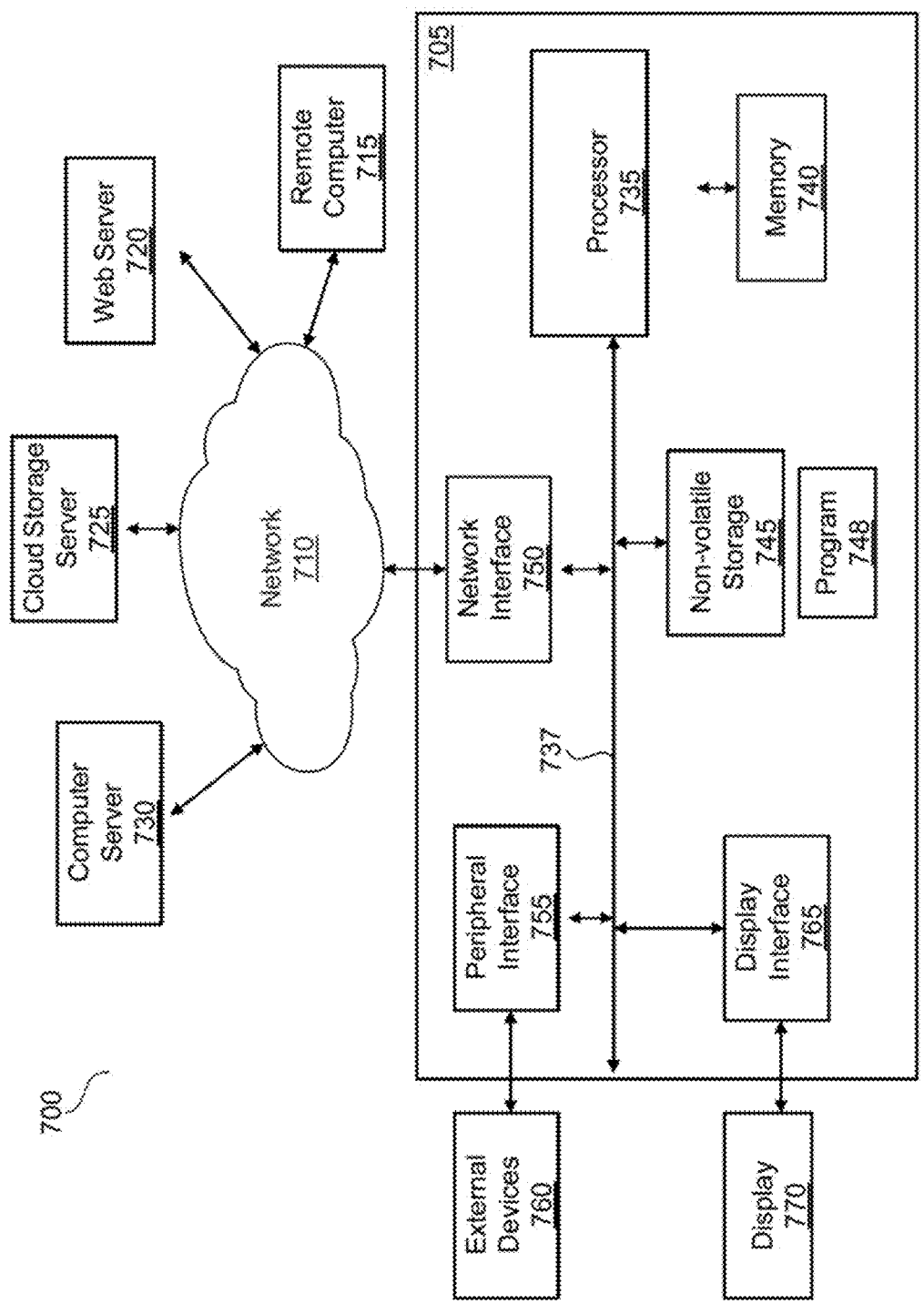
FIG. 7 is a block diagram illustrating one example of hardware on which the illustrative and non-limiting embodiment, or other embodiments, can be implemented.

The invention can be implemented in numerous ways, including as a process; an apparatus; a system; a composition of matter; a computer program product embodied on a computer readable storage medium, which may be non-transitory; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions, and may be a processor with x86 architecture or any other suitable architecture.

A detailed description of one or more embodiments of the invention is provided below along with accompanying figures that illustrate the principles of the invention. The invention is described in connection with such embodiments, but the invention is not limited to any embodiment. The scope of the invention is limited only by the claims, and the invention encompasses numerous alternatives, modifications and equivalents. Numerous specific details are set forth in the following description in order to provide a thorough understanding of the invention. These details are provided for the purpose of example, and the invention may be practiced according to the claims without some or all of these specific details. For the purpose of clarity, technical material that is known in the technical fields related to the invention has not been described in detail so that the invention is not unnecessarily obscured.

In recent years, machine learning approaches have enabled new potentials to system security. These approaches extract complex features (e.g., CFG, call graph, etc.) and feed them into machine learning models to solve different security challenges and have made great progress. For instance, Gemini makes it possible to search malicious code snippets in samples and is more resilient to code changes compared to signature-based approaches.

The cybersecurity industry has shown great interest in these novel approaches due to their better results. However, these approaches themselves rely on accurate disassembly results to extract features like CFG, call graph, etc., which comes at the cost of efficiency. Most of state-of-the-art disassemblers take a deep analysis of binaries to make results as accurate as possible at the price of low efficiency. Such kind of low efficiency limits the usage of advanced machine learning models in cybersecurity industry, since the code volume processed per day could be huge. So in the current cybersecurity industry, disassemblers are only used in less time-critical tasks (like postmortem analysis and incidence response). For time-critical tasks (like malware detection), the raw bytes of binary programs are directly fed into machine learning modules or Yara rules. This approach is extremely vulnerable to adversarial attacks, because without disassembling, only superficial features at raw byte level can be picked up by machine learning models. Thus, the lack of a scalable and accurate disassembler has become the obstacle to the applications of novel machine learning approaches in cybersecurity industry.

Traditional Disassembly Method (1) Linear Sweep Disassembly. Linear Sweep Disassembly is the most straightforward yet extremely fast disassembly method. It disassembles from the beginning of the buffer and assumes there is no data in the buffer, meaning the starting point of an instruction is the ending point of the previous instruction. However, such assumption is not guaranteed, as compilers may insert jump tables, strings or no-op instructions, so linear sweep usually has high false positives (as high as 30%) and false negatives (10%). Modern compilers do not place strings in code section, but it happens a lot in shell code. Due to the fact that shell code may be injected at any memory location, it tries to avoid as much relocation as possible.

(2) Recursive Traversal Disassembly. Recursive Traversal Disassembly was initially proposed to eliminate false positives. It starts from the entry point of a binary file and follows control flow edges. However, it cannot follow indirect jumps or calls, so it may miss quite a number of code blocks. This method usually combines with some heuristics to detect missing code blocks. Indirect control transfers are very common in complex programs. These programs have switch-case statements, virtual functions, function pointers, etc. Jump tables, such as jmp dword ptr [addr+reg*4], are relatively easy to resolve. However, there exists different variants of jump tables, and some can be difficult to resolve.

These two methods are straightforward and simple, but neither is perfect. What is left by recursive disassembly can be a mix of code and data, and there is no easy way to separate them. IDA Pro has a signature-based approach to scan common patterns of code, others may have dedicated data flow analysis to resolve indirect jumps. Neither is cheap. Code patterns can be affected by compilers, optimization levels, architectures, etc., and searching in such a large knowledge base is time-consuming. Data flow analysis generally uses an iterative algorithm and requires a lot of computational time. Since the manual-defined heuristics are not complete and slow, we build a machine learning model to automatically capture relations among instructions and use GPU and SIMD instructions in CPU to accelerate the computing.

(3) Superset Disassembly

Superset Disassembly was proposed for binary rewriting. It disassembles every byte offset of the executable code in a brute-force way so that the correct disassembly is guaranteed in the result, or in other words there is no false negative. Although a large number of instructions are false positive, all true positives are included in the result, and this makes sure that every possible transfer target can be instrumented during binary rewriting.

(4) Probabilistic Disassembly

Probabilistic Disassembly is recently proposed disassembly technique that uses probabilities to model uncertainties (interleaved code and data, indirect transfer targets, etc.). It considers register define-use relations, control flow convergence, control flow crossing and computes a probability for each address based on these features. For example, if the targets of two transfer instructions are the same, the probability of these transfer instructions and their target being true is high because it is unlikely to find two random integers to be the same. Likewise, if we find a register define-use relation, then the probability of these instructions being true is 15/16, since there are eight registers in x86 architecture. Its experiment shows that it has no false negative and false positive rate is only 3.7% on average. Probabilistic Disassembly is particularly suited in binary rewriting because it has no false negative as Superset Disassembly is, and its low false positive rate helps ease code bloating problem in binary rewriting.

Summary of Disassembly Approaches

Each disassembly approach has its pros and cons. Linear Sweep is the fastest but comes with inaccurate disassembly results due to the lack of analysis. Recursive has no false positive because it searches potential execution traces, but is relatively slow because of the extra work on trace search and can miss a substantial amount of code due to indirect transfers. Superset was proposed for binary rewriting, which is very sensitive to false negatives; thus it obtains all possible instructions, resulting in bloated false positives. Probabilistic approach inherits the advantage of Superset Disassembly, and shows it has no false negative and only very limited false positives with probabilistic guarantees. Because of its iterative algorithm and long propagation path, its runtime performance is the worst among the four approaches. These approaches show a tradeoff between accuracy and efficiency: a more accurate result requires more complex analysis, resulting in worse efficiency.

To overcome this problem, a new high-throughput disassembly system, DeepDisassembly, is presented herein. In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention and is not intended to limit the invention to the specific embodiments illustrated by the figures or description below.

The present invention will now be described by referencing the appended figures representing the preferred embodiments. The overview of DeepDisassembly is shown in FIG. 1. During training, in the Pre-processing phase, we first feed raw binary code 101 into the Exhaustive Disassembly module 102 to get a superset of instructions 103 and an Instruction Flow Graph 105 with three different kinds of edges. We then convert instructions 103 to embeddings 104, which are fixed-length vectors containing their semantic information and used as a basis for the following phases. In the Graph Inference phase, the embeddings 104 are then propagated on the Instruction Flow Graph 105 using Relational-GCN 110. The purpose of propagation is to make the likely instructions become more likely. The embeddings 104 are then passed to a fully connected layer 111 to convert them to logits, followed by a sigmoid activator 112 to normalize probabilities. Then DeepDisassembly is trained in a supervised learning way.

After the training process, the trained neural network model can be used to predict the probability of an instruction being a true instruction (i.e., instruction classification), as shown in 113. Based on the prediction results, the true instructions are identified. Moreover, in the Post-processing phase, we further leverage the prediction results 113 to recover basic blocks 116 and functions 18. We treat an instruction as the starting point of a basic block if it is not reachable by any other instruction or it can be reached by control transfer instructions. Once we have basic blocks, we link all connected basic blocks to form a function.

By using the preceding process, DeepDisassembly can precisely recover instructions, basic blocks, and functions. To provide a better understanding, FIG. 2 gives a concrete example of DeepDisassembly's instruction classification process.

Pre-Processing

In this section, we introduce the first phase in FIG. 1—the Pre-processing phase.

Exhaustive Disassembly 102

As shown in FIG. 1, our first component 102 is to generate all possible disassembly results so that we can pick out true instructions in the following steps. As can be also observed in FIG. 2, in x86 architecture, almost any byte sequence can be a valid instruction, thus we disassemble from every single byte to get a superset of instructions 203. A code section of n bytes yields n instructions. Since disassembling any instruction is independent, it can be easily parallelized. Parallelization on CPU is straightforward: divide the code block into N parts, and each thread process one part. When it comes to GPU, due to its data parallelism nature, we assign each byte address to a GPU thread. An example is shown in FIG. 3. Assuming the address of the first instruction byte is 0, we assign thread 0 to 31 (a warp) to disassemble instructions starting at memory location 0 to 31. At time 0, all threads consume one byte at location 0 to 31 accordingly at the same time. At time 1, some threads may turn inactive because they encounter 1-byte instructions and will remain inactive till all threads in this warp finish disassembling their instructions. Other threads consume the next byte, which is memory location 1 for thread 0, 2 for thread 1 and so on. The number of threads we create is the same as the number of bytes in code section, and each thread will output one instruction. The performance can be further optimized by dividing the code block into N parts and thus reduce the number of threads created.

We make each thread in a warp disassembles a consecutive memory location because of GPU global memory coalescing. When threads in a warp access an aligned and consecutive memory location, this is a coalesced access and GPU can fetch up to 128 bytes in one memory transaction. If the memory access is strided, for example, the number of stride elements is greater than 31, each memory transaction fetches only 4 bytes, wasting almost 97% of memory bandwidth.

Instruction Embedding 104

The second component is to translate instruction metadata to internal representations so that they can be used to predict the probability of instructions being valid or not. However, a single instruction does not have any context information, so technically it is valid as long as it can be decoded successfully. The way we solve this problem is to evaluate a sequence of instructions instead of just one, and is based on an observation that the successors of an unlikely instruction are also unlikely. Combined with a sequence of instructions, we can better justify the validity of an instruction. For example, the instruction 0 with instruction 3 shown in FIG. 2 is used to predict the probability of instruction 0 being true. Instruction 3 is used as context information. The length of instruction sequences affects both efficiency and accuracy, so we conducted experiments to find the optimal sequence length. We choose the sequence length 2 which results in both good accuracy and efficiency.

Each instruction is firstly encoded to embedding. We use instruction metadata, or more specifically REX prefix, opcode, ModR/M, and SIB, to represent an instruction. REX prefix, ModR/M, and SIB range from 0 to 255 because they are one-byte. Since even the same number in these fields has different meanings, we make each field have different ranges, for example, REX prefix ranges from 0 to 255, ModR/M ranges from 256 to 511 and so on, to not confuse the model. Two-byte opcode always starts with 0x0 F, so the total number of opcodes will not exceed 512 (255 for one-byte opcode and 256 for two-byte opcode). In this way, we have 1,280 categories (256 for REX prefix, 256 for ModR/M, 256 for SIB, and 512 for opcode). The instruction metadata is then fed into an embedding layer to translate index-based categories to a dense representation.

Once we get the embeddings, they are then fed into a GRU network to learn an internal representation. We choose GRU instead of LSTM network because the sequence is generally short, and GRU is faster than LSTM while achieving about the same accuracy in our case. Instruction Flow Graph 105.

We propose to capture different relations between possible instructions using a graph model called Instruction Flow Graph 105. Instruction Flow Graph and the Graph Inference phase shown in FIG. 1 are used to propagate information of each instruction to its neighbors. Instruction Flow Graph is the basis of such propagation process.

Formally, we define an instruction flow graph 105 as a directed graph $G_f = E, V$ where V is a set of exhaustively disassembled instructions, and E can be one of three edges: forward edge $e_f$, backward edge $e_b$, and overlap edge $e_o$. A forward edge from i to j means the next instruction of instruction i can be j. The backward edge is the same as the forward edge except that all the edges are reversed. An overlapped edge from i to j means instruction i and instruction j overlap, for example, the starting point of instruction j is inside instruction i.

Graph Inference

As discussed earlier, we propose to use Instruction Flow Graph and Graph Inference to propagate information of each possible instruction to its neighbors. In the Graph Inference phase, we use Relational-GCN (R-GCN) to further exploit structural information. R-GCN was proposed for link prediction (recovery missing relations) and node classification (recovery of missing entity attributes). It takes directed multi-graphs as $G = \mathcal{V}, \mathcal{E}, \mathcal{R}$ with nodes $v_i \in \mathcal{V}$, $r_i \in \mathcal{R}$ and labeled edges $v_i, r, v_j \in \mathcal{E}$, where $r \in \mathcal{R}$ R is a relation type. Each relation has an additional weight matrix $W_r$ corresponding to the importance of the relation. R-GCN will add a portion of, according to the importance, the features of nodes to their connected nodes to pass their information to their neighbors. More specifically, the propagation model for calculating the forward-pass update of a node denoted by $v_i$ in a relational (directed and labeled) multi-graph is defined as follows:

$$h_i^{l+1} = \sigma_{r \in \mathcal{R}, j \in N_i^r} \frac{1}{|\cup N_i^r \cup|} W_r^l h_j^l + W_0^l h_i^l \quad (1)$$

where $h_i^l$ is the l-th layer of the network, $N_i^r$ denotes the set of neighbor indices of node i under relation $r \in R$, $W_r^l$ is the l-th layer weight matrix of relation $r \in \mathcal{R}$. $W_0$ denotes the weight matrix of self-loop relation. The feature vectors of neighboring nodes are accumulated through a normalized sum and passed to an element-wise activation function σ, such as the ReLU(•)=max(0;•). The parameter $W_r^l$ is trained for each relation $r \in \mathcal{R}$ and each layer l. FIG. 4 illustrates how embedding vectors propagate on the Instruction Flow Graph. The subscript or superscript f, b, o and s means forward relation, backward relation, overlap relation and self-connected relation accordingly.

In our case, we want to make the successors of likely instructions more likely, the predecessors of unlikely instructions also unlikely, and overlapped instructions mutually exclusive, so we build Instruction Flow Graph to model the relations. The forward 107 and backward 108 edge can enhance the probability of the neighbors of a likely instruction; likewise, overlap edge has negative impact to all of its connected nodes. R-GCN enables us to learn different weights to guide the propagation on each relation. Its propagation is essentially a matrix multiplication, which can be highly parallelized on both CPU and GPU. Such nature helps us achieve the high-throughput goal.

Post-Processing

Basic Block Recovery 115

Basic blocks can be recovered based on results of graph inference. We propose simple heuristics for basic block recovery, the basic idea is discussed as follows: we define the set of basic block entry points as the union of transfer targets and instructions that cannot be reached by any instructions. For example, FIG. 5 shows a snippet of assembly code. 0x00E71070 and 0x00E7108E are basic block entries because they cannot be reached by any instructions. Likewise, 0x0E71073, 0x00E71089 and 0x0E75177 are also basic block entries because they are transfer targets. This process will not introduce additional false positives, and the only false negatives are indirect jumps with fallthrough statement (no break in switch-case body). FIG. 6 shows an example of this case. 0x415020 is an array of possible jump targets, namely 0x40335F, 0x403367, 0x40336F and 0x403377. Within each basic block of jump targets, there is no unconditional jump to break out of the switch-case body. If we fail to resolve the possible jump targets at 0x40330E, we are not able to identify basic blocks at 0x403367, 0x40336F and 0x403377.

Function Entrypoint Recovery 117

Our function entrypoint recovery algorithm is very similar to Basic Block Recovery. Take all recovered basic blocks, those that are not reachable by jump instructions together with call targets are our function entrypoint candidates. The candidates include non-entry basic blocks due to unresolved indirect jumps, and precision of the candidates is only 87.3%. To increase the precision of function recovery result, we trained a classification model to help remove false positives. This model has three fully connected layers stacked together. Because the number of function candidates are very limited compared to the number of superset instructions (about 1:200), this model has almost no impact on runtime performance. Our experiment shows that it helps improve the average function recovery precision from 87.3% to 99.7% while keeping recall almost the same (94.6% to 94.3%). RNN-based function identification tend to learn specific bit patterns, such as push ebp, but we identify function entrypoint based on high-level features learnt by the network and accurate instruction and basic block information, and thus is more robust.

Downstream Application

To further illustrate how machine learning based solutions can benefit from our invention, we integrate DeepDisassembly with Gemini, a well-known code similarity detection tool, to show how the presented invention can apply Gemini in real-time analysis. It has three components: Feature Extraction, Embedding and Matching. Feature Extraction extracts manually selected features from binaries; Embedding transforms the features to fixed-length vectors and Matching searches these vectors in its database.

To evaluate the effectiveness of Gemini, we randomly select 214 Windows 10 x64 system DLLs and get debug symbols from the Microsoft public symbol server. The total size of these DLLs is 264 MB. We record the time it used in Feature Extraction and Embedding, as well as the overall end-to-end embedding generation time. We changed our post-processing step so that it extracts the same features as Gemini does, and we used our GPU version for this test.

Our experiment shows that Feature Extraction takes about 98.9% of the total processing time, and this is because the original Gemini has a complicated IDAPython script to extract features from binary code. DeepDisassembly reduces the Feature Extraction time from 15.96 hours to 3.5 minutes, and the end-to-end embedding generation time from 16.14 hours to 14.6 minutes.

FIG. 7 is a functional block diagram illustrating a networked system 700 of one or more networked computers and servers. In an embodiment, the hardware and software environment illustrated in FIG. 7 may provide an exemplary platform for implementation of the software and/or methods according to the present disclosure.

Referring to FIG. 7, a networked system 700 may include, but is not limited to, computer 705, network 710, remote computer 715, web server 720, cloud storage server 725, and computer server 730. In some embodiments, multiple instances of one or more of the functional blocks illustrated in FIG. 7 may be employed.

Additional detail of computer 705 is shown in FIG. 7. The functional blocks illustrated within computer 705 are provided only to establish exemplary functionality and are not intended to be exhaustive. While details are not provided for remote computer 715, web server 720, cloud storage server 725, and computer server 730, these other computers and devices may include similar functionality to that shown for computer 705.

Computer 705 may be a personal computer (PC), a desktop computer, laptop computer, tablet computer, netbook computer, a personal digital assistant (PDA), a smart phone, or any other programmable electronic device capable of communicating with other devices on network 710.

Computer 705 may include processor 735, bus 737, memory 740, non-volatile storage 745, network interface 750, peripheral interface 755 and display interface 765. Each of these functions may be implemented, in some embodiments, as individual electronic subsystems (integrated circuit chip or combination of chips and associated devices), or, in other embodiments, some combination of functions may be implemented on a single chip (sometimes called a system on chip or SoC).

Processor 735 may be one or more single or multi-chip microprocessors, such as those designed and/or manufactured by Intel Corporation, Advanced Micro Devices, Inc. (AMD), Arm Holdings (Arm), Apple Computer, etc. Examples of microprocessors include Celeron, Pentium, Core i3, Core i5 and Core i7 from Intel Corporation; Opteron, Phenom, Athlon, Turion and Ryzen from AMD; Cortex-A, Cortex-R and Cortex-M from Arm; and Apple Silicon M1 from Apple. Of course, any other suitable processor or processors can be used instead of or in addition to the foregoing.

Bus 737 may be a proprietary or industry standard high-speed parallel or serial peripheral interconnect bus, such as ISA, PCI, PCI Express (PCI-e), AGP, or the like.

Memory 740 and non-volatile storage 745 may be computer-readable storage media. Memory 740 may include any suitable volatile storage devices such as Dynamic Random Access Memory (DRAM) and Static Random Access Memory (SRAM). Non-volatile storage 745 may include one or more of the following: flexible disk, hard disk, solid-state drive (SSD), read-only memory (ROM), erasable programmable read-only memory (EPROM or Flash), compact disc (CD or CD-ROM), digital versatile disk (DVD), and memory card or stick.

Program 748 may be a collection of machine readable instructions and/or data that is stored in non-volatile storage 745 and is used to create, manage and control certain software functions that are discussed in detail elsewhere in the present disclosure and illustrated in the drawings. In some embodiments, memory 740 may be considerably faster than non-volatile storage 745. In such embodiments, program 748 may be transferred from non-volatile storage 745 to memory 740 prior to execution by processor 735.

Computer 705 may be capable of communicating and interacting with other computers via network 810 through network interface 750. Network 710 may be, for example, a local area network (LAN), a wide area network (WAN) such as the Internet, or a combination of the two, and may include wired, wireless, or fiber optic connections. In general, network 710 can be any combination of connections and protocols that support communications between two or more computers and related devices.

Peripheral interface 755 may allow for input and output of data with other devices that may be connected locally with computer 705. For example, peripheral interface 755 may provide a connection to external devices 760. External devices 760 may include devices such as a keyboard, a mouse, a keypad, a touch screen, and/or other suitable input devices. External devices 760 may also include portable computer-readable storage media such as, for example, thumb drives, portable optical or magnetic disks, and memory cards. Software and data used to practice embodiments of the present disclosure, for example, program 748, may be stored on such portable computer-readable storage media. In such embodiments, software may be loaded onto non-volatile storage 745 or, alternatively, directly into memory 740 via peripheral interface 755. Peripheral interface 755 may use an industry standard connection, such as RS-232 or Universal Serial Bus (USB), to connect with external devices 760.

Display interface 765 may connect computer 705 to display 770. Display 770 may be used, in some embodiments, to present a command line or graphical user interface to a user of computer 705. Display interface 765 may connect to display 770 using one or more proprietary or industry standard connections, such as VGA, DVI, DisplayPort and HDMI.

As described above, network interface 750, provides for communications with other computing and storage systems or devices external to computer 705. Software programs and data discussed herein may be downloaded from, for example, remote computer 715, web server 720, cloud storage server 725 and computer server 730 to non-volatile storage 745 through network interface 750 and network 710. Furthermore, the systems and methods described in this disclosure may be executed by one or more computers connected to computer 705 through network interface 750 and network 710. For example, in some embodiments the systems and methods described in this disclosure may be executed by remote computer 715, computer server 730, or a combination of the interconnected computers on network 710.

Data, datasets and/or databases employed in embodiments of the systems and methods described in this disclosure may be stored and or downloaded from remote computer 715, web server 720, cloud storage server 725 and computer server 730.

Figure 8:
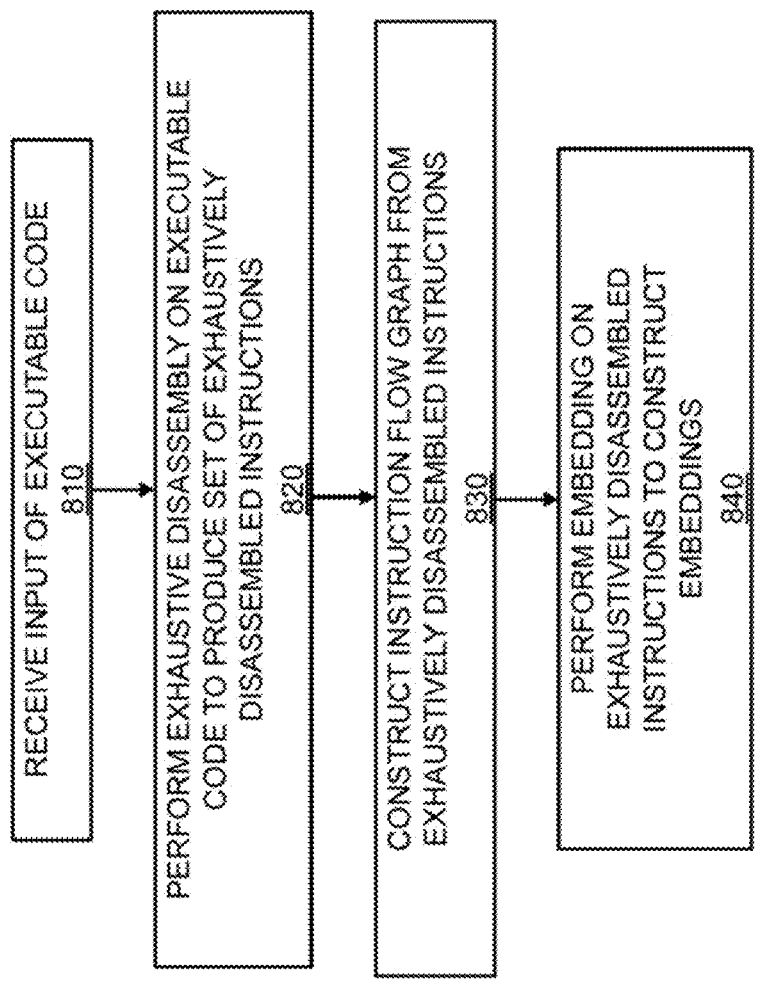
FIG. 8 is a flow chart showing processing that can be used to implement the illustrative and non-limiting embodiment or other embodiments.

FIG. 8 is a flow chart showing processing that can be used to implement the illustrative and non-limiting embodiment or other embodiments. In step 810, an input of the executable code is received. In step 820, exhaustive disassembly is performed on the executable code to produce a set of exhaustively disassembled instructions. In step 830, an instruction flow graph is constructed from the exhaustively disassembled instructions. In step 840, instruction embedding is performed on the exhaustively disassembled instructions to construct embeddings.

While a preferred embodiment has been set forth above, those skilled in the art who have reviewed the present disclosure will readily appreciate that other embodiments can be realized within the scope of the invention. For example, numerical values are illustrative rather than limiting, as are mentions of known tools. Accordingly, the present invention should be construed as limited only by the appended claims.

What is claimed is:

1. A system for high-throughput disassembly for executable code comprising a plurality of instructions, comprising:
   circuitry configured to
   receive an input of the executable code;
   perform exhaustive disassembly on the executable code to generate all possible disassembly results to produce a set of exhaustively disassembled instructions;
   construct an instruction flow graph from the exhaustively disassembled instructions;
   perform instruction embedding on the exhaustively disassembled instructions to construct embeddings; and
   identify which of the exhaustively disassembled instructions are true instructions in accordance with the instruction flow graph and the instruction embedding, wherein the true instructions are instructions generated by a compiler.

2. The system of claim 1, wherein the circuitry is further configured to apply the instruction flow graph to capture different relations among the plurality of instructions in the executable code.

3. The system of claim 1, wherein the circuitry is further configured to implement translation of instruction metadata including REX prefix, opcode, ModR/M and SIB, into internal representations to predict a probability of the plurality of instructions in the executable code being the true instructions or not.

4. The system of claim 3, wherein the circuitry is further configured to apply a GRU network to learn an internal representation of the plurality of instructions in the executable code.

5. The system of claim 1, wherein the circuitry is further configured to apply graph inference on the instruction flow graph to propagate information of each of the plurality of instructions in the executable code to neighboring ones of the plurality of instructions in the executable code.

6. The system of claim 5, wherein the circuitry is further configured to apply Relational-GCN to exploit structural information in the instruction flow graph.

7. The system of claim 1, wherein the circuitry is further configured to implement an acceleration of code similarity detection solution using a code similarity detection tool.

8. A method for high-throughput disassembly for executable code comprising a plurality of instructions, comprising:
receiving an input of the executable code;
performing exhaustive disassembly on the executable code to generate all possible disassembly results to produce a set of exhaustively disassembled instructions;
constructing an instruction flow graph from the exhaustively disassembled instructions;
performing instruction embedding on the exhaustively disassembled instructions to construct embeddings; and
identifying which of the exhaustively disassembled instructions are true instructions in accordance with the instruction flow graph and the instruction embedding, wherein the true instructions are instructions generated by a compiler.

9. The method of claim 8, further comprising applying the instruction flow graph to capture different relations among the plurality of instructions in the executable code.

10. The method of claim 8, further comprising implementing translation of instruction metadata including REX prefix, opcode, ModR/M and SIB, into internal representations to predict a probability of the plurality of instructions in the executable code being the true instructions or not.

11. The method of claim 10, further comprising applying a GRU network to learn an internal representation of the plurality of instructions in the executable code.

12. The method of claim 8, further comprising applying graph inference on the instruction flow graph to propagate information of each of the plurality of instructions in the executable code to neighboring ones of the plurality of instructions in the executable code.

13. The method of claim 12, further comprising applying Relational-GCN to exploit structural information in the instruction flow graph.

14. The method of claim 8, further comprising implementing an acceleration of code similarity detection solution using a code similarity detection tool.

15. A non-transitory, computer readable medium storing instructions that, when executed on a computer, control the computer to perform a method for high-throughput disassembly for executable code comprising a plurality of instructions, the method comprising:
receiving an input of the executable code;
performing exhaustive disassembly on the executable code to generate all possible disassembly results to produce a set of exhaustively disassembled instructions;
constructing an instruction flow graph from the exhaustively disassembled instructions;
performing instruction embedding on the exhaustively disassembled instructions to construct embeddings; and
identifying which of the exhaustively disassembled instructions are true instructions in accordance with the instruction flow graph and the instruction embedding, wherein the true instructions are instructions generated by a compiler.

16. The non-transitory, computer-readable medium of claim 15, wherein the method further comprises applying the instruction flow graph to capture different relations among the plurality of instructions in the executable code.

17. The non-transitory, computer-readable medium of claim 15, wherein the method further comprises implementing translation of instruction metadata including REX prefix, opcode, ModR/M and SIB, into internal representations to predict a probability of the plurality of instructions in the executable code being the true instructions or not.

18. The non-transitory, computer-readable medium of claim 15, wherein the method further comprises applying graph inference on the instruction flow graph to propagate information of each of the plurality of instructions in the executable code to neighboring ones of the plurality of instructions in the executable code.

19. The non-transitory, computer-readable medium of claim 18, wherein the method further comprises applying Relational-GCN to exploit structural information in the instruction flow graph.

20. The non-transitory, computer-readable medium of claim 15, wherein the method further comprises implementing an acceleration of code similarity detection solution using a code similarity detection tool.

* * * * *